US008489594B2

(12) United States Patent
Bourke et al.

(10) Patent No.: US 8,489,594 B2
(45) Date of Patent: Jul. 16, 2013

(54) PLAYLIST OVERRIDE QUEUE

(75) Inventors: David Bourke, Cary, NC (US); Patrick Pless, Raleigh, NC (US); Sultan Mehrabi, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 738 days.

(21) Appl. No.: 11/703,866

(22) Filed: Feb. 7, 2007

(65) Prior Publication Data

US 2008/0189318 A1    Aug. 7, 2008

(51) Int. Cl.
G06F 7/00        (2006.01)
G06F 17/30       (2006.01)

(52) U.S. Cl.
USPC ............ 707/732; 707/733; 707/734; 707/913

(58) Field of Classification Search
USPC .......................... 707/752, 913, 732, 733, 734
See application file for complete search history.

(56) References Cited

U.S. PATENT DOCUMENTS

| | | | | |
|---|---|---|---|---|
| 5,355,302 | A * | 10/1994 | Martin et al. | 700/234 |
| 6,205,140 | B1 * | 3/2001 | Putzolu et al. | 370/389 |
| 6,748,395 | B1 * | 6/2004 | Picker et al. | 707/102 |
| 6,990,497 | B2 * | 1/2006 | O'Rourke et al. | 707/999.101 |
| 7,269,415 | B2 * | 9/2007 | Bostrom et al. | 455/419 |
| 7,663,045 | B2 * | 2/2010 | Schmidt et al. | 84/600 |
| 2002/0049974 | A1 * | 4/2002 | Shnier | 725/47 |
| 2002/0138641 | A1 * | 9/2002 | Taylor et al. | 709/231 |
| 2003/0009452 | A1 * | 1/2003 | O'Rourke et al. | 707/3 |
| 2003/0053240 | A1 * | 3/2003 | Bruner et al. | 360/69 |
| 2003/0182315 | A1 * | 9/2003 | Plastina et al. | 707/200 |
| 2004/0123725 | A1 * | 7/2004 | Kim | 84/609 |
| 2005/0091690 | A1 * | 4/2005 | Delpuch et al. | 725/88 |
| 2005/0249080 | A1 * | 11/2005 | Foote et al. | 369/59.1 |
| 2006/0041674 | A1 * | 2/2006 | Reme | 709/231 |
| 2006/0218294 | A1 * | 9/2006 | Rosenberg | 709/231 |
| 2007/0098351 | A1 * | 5/2007 | East et al. | 386/46 |
| 2007/0271065 | A1 * | 11/2007 | Gupta et al. | 702/160 |
| 2008/0010342 | A1 * | 1/2008 | Gebhardt et al. | 709/204 |
| 2008/0033990 | A1 * | 2/2008 | Hutson et al. | 707/104.1 |

OTHER PUBLICATIONS iPod Features Guide, Aquired at: http://manuals.info.apple.com/en/iPod_Late_2006)_Features_Guide.pdf, 30 pages, (pp. 2-30), Apple Computer, 2006.

* cited by examiner

*Primary Examiner* — Mariela Reyes
(74) *Attorney, Agent, or Firm* — Fish & Richardson P.C.

(57) ABSTRACT

In one embodiment, a method for determining files to play is provided. The method includes determining an override file. For example, files may be designated and put into an override queue. A point in the playlist of files currently being played on a device is determined. This is a point in which the override file should be played. The playing of the playlist of files is then interrupted at the determined point and the override file is played. After the override file is played, the playing of the playlist of files is automatically resumed. The play may be resumed substantially at a point where playing of the playlist would have continued had it not been stopped. Accordingly, a playlist may be overridden without completely exiting out of the playlist or changing the playlist.

20 Claims, 4 Drawing Sheets

US 8,489,594 B2

PLAYLIST OVERRIDE QUEUE

TECHNICAL FIELD

Particular embodiments generally relate to multimedia applications.

BACKGROUND

Media players are increasingly being used to play digital files, such as digital music. For example, media players can store hundreds of songs digitally and play them back. Because of the large number of songs, it is sometimes desirable to create a playlist, which is a list of songs that are played together consecutively, randomly, etc. For example, the user may choose a list of twenty songs that relate to an artist (e.g., an album), a list of their favorite songs, etc. Once the playlist is started, only the twenty songs on the playlist can be played.

At some point during playing of the playlist, a user may want to hear another song. When a user selects a song from outside the current playlist, different actions may be performed. For example, the song may be added to the bottom of the playlist and will be played when the end of the playlist is reached. Also, the song may begin playing immediately. In this case, the play of a playlist may be ended. Further, the user can drag and drop the new song and place it under the current playlist. This may modify the current playlist to include the new song. Accordingly, the above actions modify the playlist or end the playing of the playlist. If playing of the playlist is stopped, the user may have to then take steps to restart playing the playlist, which typically does not start at the point at which the user stopped the playlist. For example, the playlist may start at the beginning or the user may have to determine where the playlist stopped and manually start it at a song around where it stopped. Also, if the song is added to playlist, it alters the playlist, which the user may not desire.

DETAILED OF EXAMPLE EMBODIMENTS

Overview

In one embodiment, a method for determining files to play is provided. The method includes determining an override file. For example, files may be designated and put into an override queue. A point in the playlist of files currently being played on a device is determined. This is a point in which the override file should be played. The playing of the playlist of files is then interrupted at the determined point and the override file is played. For example, when a playlist of songs is being played, the playlist may be interrupted when a song ends and then the override file (e.g., a new song not in the playlist) is played. After the override file is played, the playing of the playlist of files is automatically resumed. The play may be resumed substantially at a point where playing of the playlist would have continued had it not been stopped (e.g., the next song). Accordingly, a playlist may be overridden without completely exiting out of the playlist or changing the playlist.

Example Embodiments

Figure 1:
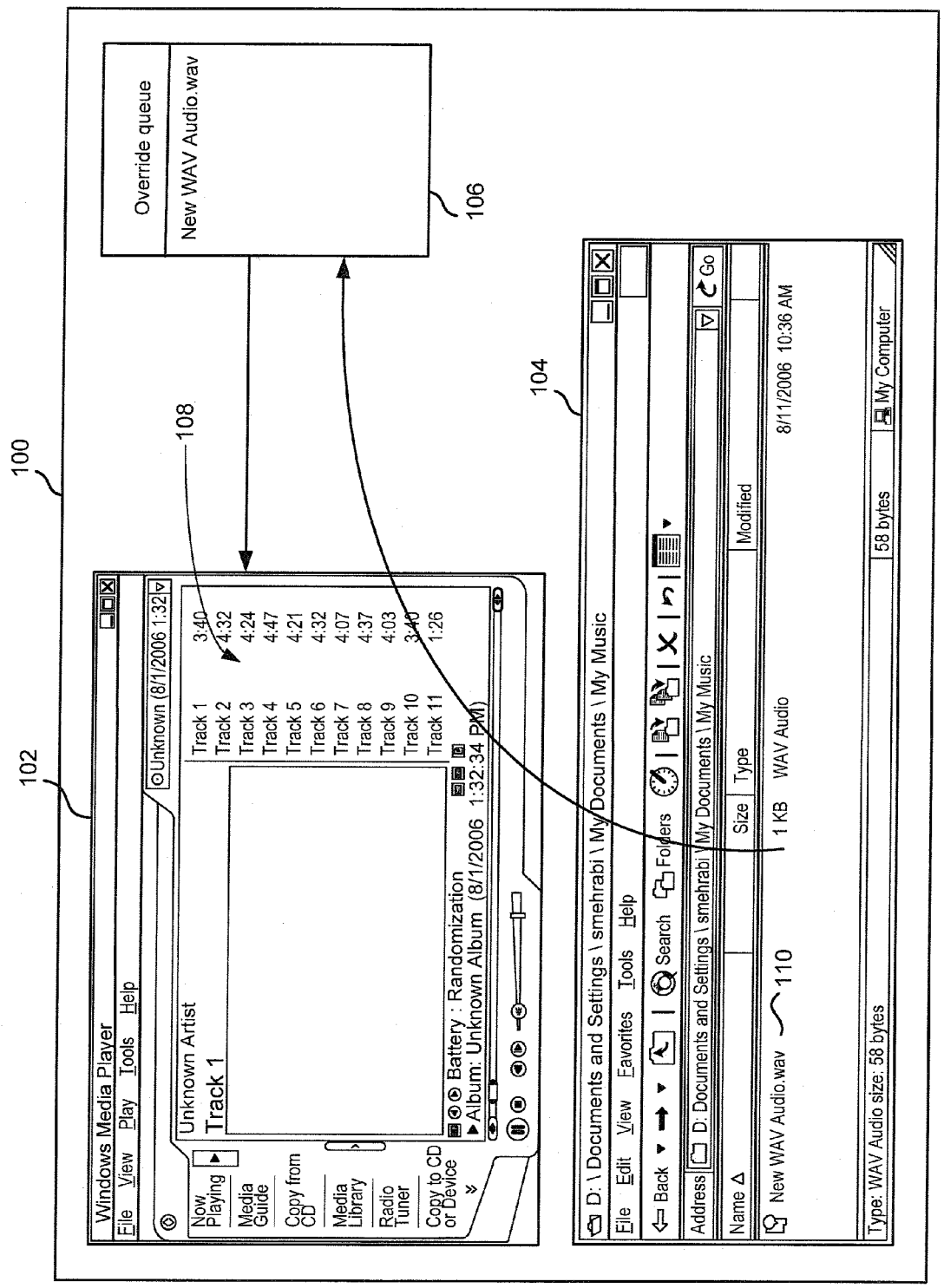
FIG. 1 shows an example of a display showing an override queue.

FIG. 1 shows an example of a display 100 showing an override queue. As shown, display 100 includes a media player 102, a list of override files 104, and an override queue window 106.

Media player 102 may be any media player that can play media of any type or format. For example, media player 102 may be a Windows Media Player™ or any other application. Also media player 102 may be part of a media player device, such as an IPod™, cellular phone, personal digital assistant (PDA), laptop computer, set-top box, etc.

Media player 102 may be any application that may be used to play digital files. For example, the digital files that may be played may be audio and/or video data. In one example, songs may be played using media player 102. Although songs may be described as examples in this discussion, it will be understood that the files may include any media information. For example, the files may include voicemails, emergency broadcast alerts, alarm notifications, video, service provider commercials and announcements, or any other information.

As shown, media player 102 includes a user playlist window 108. User playlist window 108 may include a list of files that are going to be played. For example, a user may have a large number of files that are stored, such as 500, 1,000, 10,000, etc. songs. Playlist window 108 includes a subsection of these songs. The subsection may be an artist's album, a genre of songs, a list of favorite songs, or any other categorization of songs. The playlist may be created by selecting (e.g., double clicking, right clicking, dragging and dropping, etc.) songs that may be included in the playlist. For example, a user's favorite songs may be selected and included in the playlist.

Media player 102 may play songs in playlist window 108 consecutively, randomly, through shuffle, etc. In any case, the only tracks that will be played are from playlist window 108 (e.g., the 13 tracks shown). Thus, when a playlist is played, only songs from that playlist are played.

Conventionally, as discussed in the background of the disclosure, for a user to play a file that is not in the playlist, the playlist is modified or the playing of the playlist is ended. The user then has to manually start the play of the playlist again by selecting the playlist to start it again. However, most likely, the playlist will start at the beginning as if the user had not played the playlist before. The user can manually estimate where the playlist was interrupted and start the playlist again. However, this requires the user to manually determine a song where the playlist was interrupted and start playback at that song. Accordingly, it conventionally takes many steps for a user to play a file that is not in the playlist and to restart playing of the playlist.

Particular embodiments allow the interrupting of the play of a playlist. An override file may be played during the interruption and then playing of the playlist is automatically resumed after the playing of the overridden file. This is convenient for a user that wants to listen to a song that is not in a playlist.

Override files may be designated as override files using many different methods. For example, a user may select a file to designate it as an override file. As shown, window 104 may include a file 110. Once it is selected, it may be designated as an override file. For example, it may be shown in an override queue window 106. In one embodiment, the user may navigate on display 100 to a file that the user wants to add to override queue window 106. In this case, a user has navigated to a directory "My Music", which includes the file "New Wav Audio.wav". This may be a file that has been stored on the user's device (or any other device such as external storage). The user may then select file 110, such as double clicking on it, and file 110 is automatically added to override queue window 106. Additionally, other methods of designating the override file as an override queue file may be appreciated, such as drag and drop methods, right click methods, etc.

Override queue window 106 may be a window that is shown in display 100. Multiple files may be added to override queue window 106. In one embodiment, override queue window 106 does not need to be shown on display 100. For example, an icon or indication that "New Wav Audio.wav" is designated as an override file may be shown in window 104. Further, override queue window 106 may be shown in media player 102.

The override queue may be a conceptual queue for the override files that are selected. For example, the override queue keeps track of which files have been added to the queue and where they are stored (i.e., how they can be accessed and played). Then, when it is time to play an override file from the override queue, the override file is retrieved and played. In another embodiment, file 110 may be copied to a queue. In this case, override file 110 may be played from the queue.

Once a file is added to the override queue, a point for interrupting the play of playlist window 108 is determined. For example, the point may be where the playing of a file ends or where the playing of a new file is supposed to begin. For example, the determined point may be in-between tracks. Other points may also be appreciated. For example, once a file is added to override queue window 106, then the playing of playlist may be interrupted. Also, the playing of the playlist may be interrupted when a silence is detected in the playing of the playlist.

In one embodiment, when a track ends, the override queue is checked for any entries. If there is a file in the override queue, then the playing of playlist window 108 is interrupted. The file in override queue window 106 is then played in media player 102.

Once the override file 110 is played, the playing of playlist window 108 is automatically resumed. For example, it may be resumed substantially at the point at which the playlist would have been at if the interruption had not occurred. In one example, if the playlist was interrupted at the end of track 1, then the playlist is automatically restarted at the beginning of track 2. However, if a setting such as random play is used, then the next song played may not be the next sequential song but the next randomly selected song.

The override file may be played without altering the original playlist. For example, the number of tracks 1-13 in playlist window 108 remains the same and in the same order. Thus, the override file is not added to the playlist.

Figure 2:
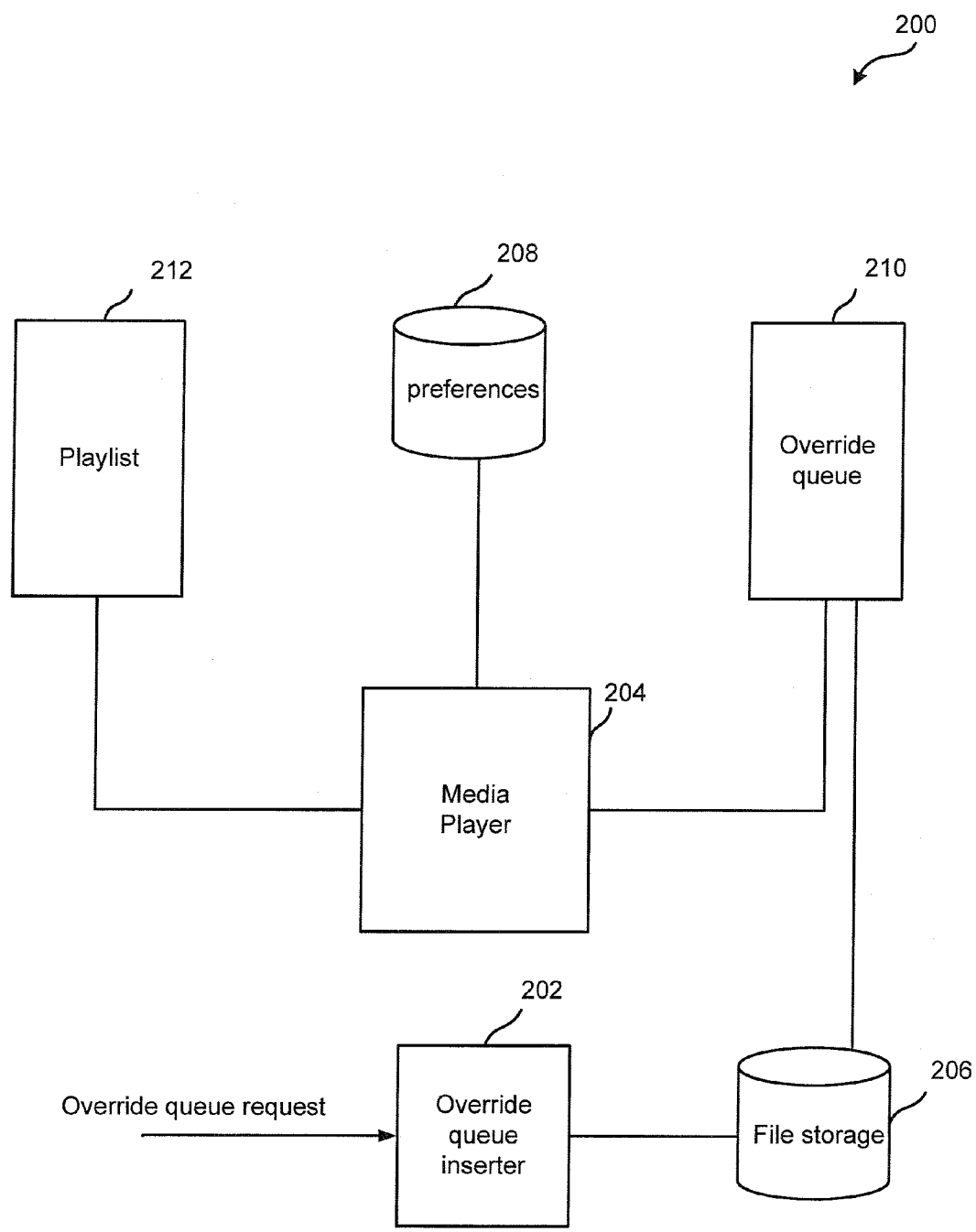
FIG. 2 shows an example of a device configured to implement the override queue.

FIG. 2 shows an example of a device 200 configured to implement the override queue. As shown, an override queue inserter 202, a player 204, file storage 206, preferences storage 208, override queue 210, and a playlist 212 are shown.

Override queue 210 and playlist 212 may be conceptual. For example, playlist 210 may include the thirteen tracks shown in playlist window 108. Also, override queue 210 may include files added to override queue window 106. Playlist 212 and override queue 210 may include information (e.g., pointers) that keep track of which files are in each. The files may be stored in device 200 or be stored separately in other devices, such as on a server, in an external hard drive, etc.

Override queue inserter 202 receives a file override request. For example, a user may select a file that he/she wants to insert in override queue 210. Also, a file override request may be received from other sources. For example, an application or external source may send a message indicating that a file should be inserted in override queue 210. This situation will be described in more detail below.

Override queue inserter 202 determines the file that should be inserted in override queue 210. The file is then inserted in override queue 210. In one embodiment, the actual file may be stored in override queue 210 or a pointer to where a file is stored in file storage 206 is stored.

Media player 204 may be playing songs from playlist 212. Player 204 may then determine when to interrupt the playlist window 108 and play an override file from override queue 210. In one embodiment, player 204 may include software or a plug-in that determines when to play a file from override queue 210. Preferences in storage 208 may be used determine when a user wants to override a playlist. For example, the user may specify that playlist window 108 should be interrupted immediately upon receiving a file override request, between the playing of files, not at all, etc. Player 204 then determines a point in which to interrupt the play of playlist window 108. A file from override queue 210 is then retrieved and it is played using media player 204. When the file is finished playing, player 204 then automatically resumes play of the playlist window 108.

Figure 3:
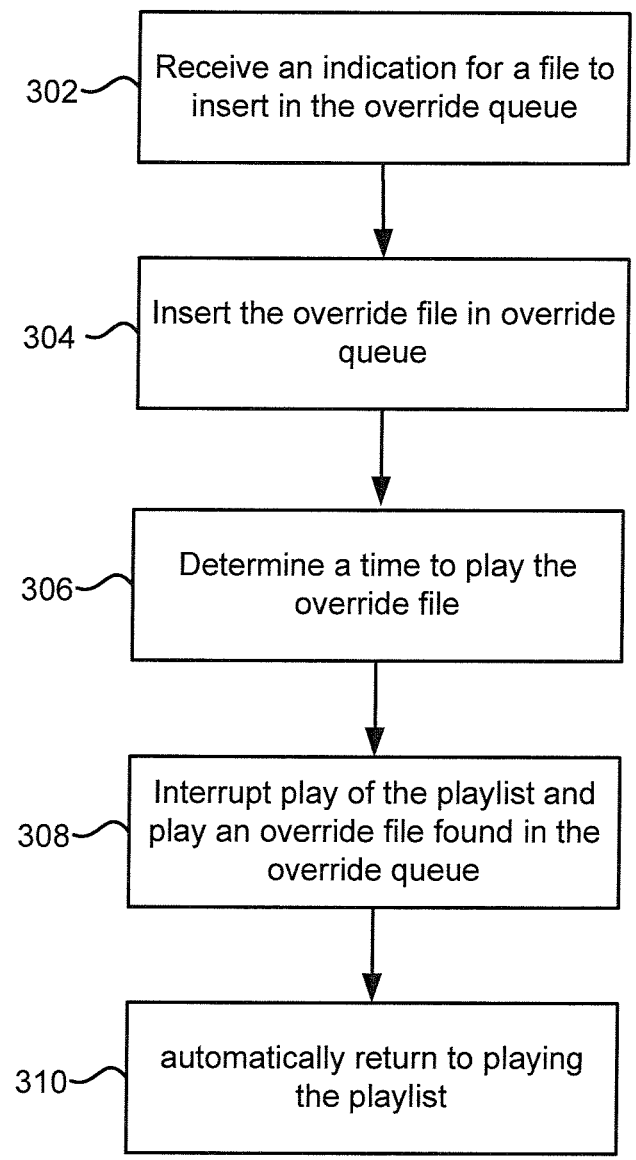
FIG. 3 depicts a method for playing files from an override queue.

FIG. 3 depicts a method for playing files from an override queue. Step 302 receives an indication for a file to insert in override queue 210. For example, the request may be received by selecting an override file.

Step 304 inserts the override file in override queue 210. Step 306 then determines a time to play the override file. For example, playing of the playlist is monitored and, when a determined point is reached, the override file may be played. Also, override queue 210 may be checked at certain points, such as at the end of playing a file to determine if any override files are found in it.

Step 308 interrupts play of the playlist and plays an override file found in the override queue 210. The override file found in override queue 210 is not added to playlist 212. Thus, the playlist 212 is not altered (but it can be in some embodiments).

Step 310 automatically returns to playing the playlist. For example, the next file that would have been played in playlist 212 after the interruption may be played.

Figure 4:
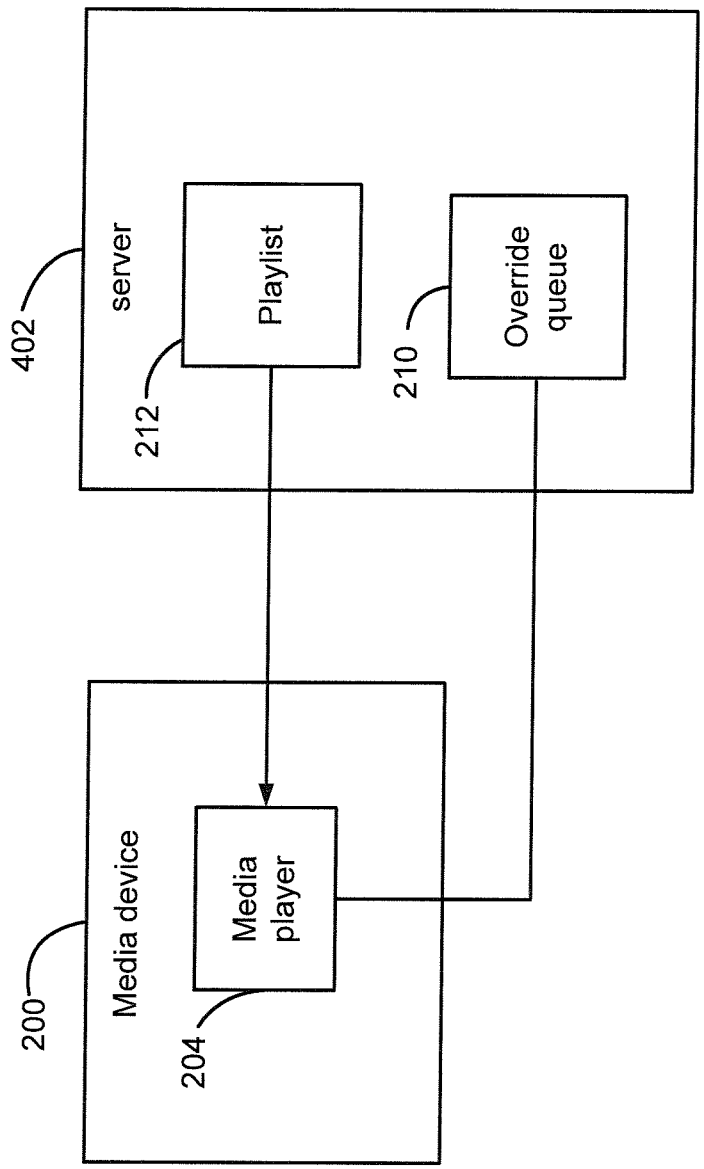
FIG. 4 depicts an example of a system for using an override queue.

FIG. 4 depicts an example of a system for using an override queue. As shown, a server 402 and device 200 are provided. In this case, server 402 may be sending streaming media to device 200. For example, device 200 may be a cellular phone and may receive streaming media from server 402. In other embodiments, device 200 may be a computer that is receiving streaming media, such as an instant message client that is receiving songs that are in the playlist.

Accordingly, the files being played in a playlist may not be stored on device 200. Rather, they may be stored on server 402. When it is decided that the streaming media from playlist 212 is to be interrupted, an override file may be placed in override queue 210. When this occurs, a point to interrupt the streaming media from playlist 212 is determined. The override file is then played as streaming media to device 200. Then, device 200 may play the override file. Once playing of the override file is finished, playing of playlist is resumed at server 402.

Device 200 may have preferences set on how to handle the override file. For example, preferences may state that streaming media should not be interrupted by an override file. Server 402 may send a message to device 200 indicating that a file has been inserted in override queue 210. Device 200 may choose to play an override file or it may choose to continue playing the streaming media. For example, device preferences may be already set to accept or deny an override file or a user may be prompted to make a decision. A message is sent back to server 402 to indicate what preference is desired. Also, server 402 may allow device 200 to decide which file to play on media player 204. Both the override file (e.g., via override queue 210) and a file from playlist 212 may be sent from server 402 to media device 200. Device 200 may then decide which file to play on media player 204. This may require some buffering of the streaming media to allow for a user to make a decision without interrupting of the playlist or the playlist may continue playing until a user makes a decision on whether to interrupt the playlist or not.

The override queue may be very useful for many applications other than music. For example, when a voicemail is received for device 200, it may be placed in the override queue 210. In this case, if a user is listening to streaming music, the voicemail may be played upon interruption of playlist window 108. After the playing of the voicemail, the play of the playlist may automatically be resumed. Also, emergency broadcasts may be inserted in override queue 210 when necessary.

Accordingly, particular embodiments provide many advantages. Files may be inserted in a playlist without modifying the original playlist. Thus, when a user desires to play a new song, the playlist does not have to be altered and the new song can just be played. This may be useful when a user thinks of a song while listening to a playlist and wants to play it immediately. However, the user does not want to have to re-setup the playlist and start it from the point at which the user interrupted it.

Although the description has been described with respect to particular embodiments thereof, these particular embodiments are merely illustrative, and not restrictive. Although songs are discussed, the override queue may be used with any media.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer-readable medium can be, by way of example only but not by limitation, a semiconductor system, apparatus, system, device, or computer memory.

Particular embodiments can be implemented in the form of control logic in hardware or a combination of both hardware and software. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, a used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
receiving, from a server, a message indicating that an override file should be accessed and inserted in an override queue, the override file being a media file originating from a source other than a playlist;
responsive to receiving the message from the server, accessing the override file and inserting the override file in the override queue;
prompting, while a device is accessing a playlist of files hosted on the server, a user on the device for a preference to continue to access the playlist of files or to access the override file;
sending a message to the server indicating a selected preference;
determining, in response to receiving the selected preference and by monitoring on the device, a point in the playlist of files currently being played on the device at which to subsequently play the override file, the determined point to be monitored for is a) between an end of a first file being played from the playlist and a beginning of a second file in the playlist or b) at a detection of silence in the playing of the playlist;
interrupting, based on the received message from the server, playing of the playlist of files in response to the playing of the playlist reaching the determined point;
playing the override file on the device in response to the interrupting of the playing of the playlist; and
automatically resuming from the determined point, playing of the playlist of files on the device after the playing of the override file, wherein the playlist of files is not altered by the playing of the override file.

2. The method of claim 1, wherein the monitoring for the determined point monitors the playlist based on preferences that are specified by a user.

3. The method of claim 1, further comprising receiving a voicemail for the user and placing the voicemail in override file.

4. The method of claim 1, wherein the accessing the override file comprises selecting the override file from one or more files found in the override queue.

5. The method of claim 1, further comprising determining preferences for the override file, wherein the determined point is determined based on the preferences.

6. The method of claim 1, wherein the override file comprises a song.

7. The method of claim 1, wherein media in the playlist is being received in a stream from a server, and wherein the playing of the override file interrupts the streaming of the media in the playlist.

8. An apparatus comprising:
one or more processors; and
logic encoded in one or more tangible media for execution by the one or more processors, and when executed operable to:
receive, from a server, a message indicating that an override file should be accessed and inserted in an override queue, the override file being a media file originating from a source other than a playlist;
responsive to receiving the message from the server, access the override file and inserting the override file in the override queue;
prompt, while a device is accessing a playlist of files hosted on the server, a user on the device for a preference to continue to access the playlist of files or to access the override file;
send a message to the server indicating a selected preference;
determine, in response to receiving the selected preference and by monitoring on the device, a point in the playlist of files currently being played on the device at which to subsequently play the override file, the determined point to be monitored for is a) between an end of a first file being played from the playlist and a beginning of a second file in the playlist or b) at a detection of silence in the playing of the playlist;
interrupt, based on the received message from the server, playing of the playlist of files in response to the playing of the playlist reaching the determined point;
play the override file on the device in response to the interrupting of the playing of the playlist; and
automatically resume from the determined point, playing of the playlist of files on the device after the playing of the override file, wherein the playlist of files is not altered by the playing of the override file.

9. The apparatus of claim 8, wherein the monitoring for the determined point monitors the playlist based on preferences that are specified by a user.

10. The apparatus of claim 8, wherein the logic when executed is further operable to receive a voicemail for the user and place the voicemail in the override file.

11. The apparatus of claim 8, wherein the logic when executed is further operable to select the override file from one or more files found in the override queue.

12. The apparatus of claim 8, wherein the logic when executed is further operable to determine preferences for the override file, wherein the determined point is determined based on the preferences.

13. The apparatus of claim 8, wherein the override file comprises a song.

14. The apparatus of claim 8, wherein media in the playlist is being received in a stream from a server, and wherein the logic when executed is further operable to interrupt the playing of the media in the playlist to play the override file.

15. An apparatus comprising:
a processor;
means for receiving, from a server, a message indicating that an override file should be accessed and inserted in an override queue, the override file being a media file originating from a source other than a playlist;
means for accessing the override file and, in response to receiving the message from the server, inserting the override file in the override queue;
means for prompting, while a device is accessing a playlist of files hosted on the server, a user on the device for a preference to continue to access the playlist of files or to access the override file;
means for sending a message to the server indicating a selected preference;
means for determining, in response to receiving the selected preference and by monitoring on the device, a point in the playlist of files currently being played on the device at which to subsequently play the override file, the determined point to be monitored for is a) between an end of a first file being played from the playlist and a beginning of a second file in the playlist or b) at a detection of silence in the playing of the playlist;
means for interrupting, based on the received message from the server, playing of the playlist of files in response to the playing of the playlist reaching the determined point;
means for playing the override file on the device in response to the interrupting of the playing of the playlist; and
means for automatically resuming from the determined point, playing of the playlist of files on the device after the playing of the override file, wherein the playlist of files is not altered by the playing of the override file.

16. The apparatus of claim 15, further comprising means for receiving a voicemail for the user and placing the voicemail in override file.

17. The apparatus of claim 15, wherein the accessing the override file comprises selecting the override file from one or more files found in the override queue.

18. The apparatus of claim 15, further comprising means for determining preferences for the override file, wherein the determined point is determined based on the preferences.

19. The apparatus of claim 15, wherein the override file comprises a song.

20. The apparatus of claim 15, wherein media in the playlist is being received in a stream from a server, and wherein the playing of the override file interrupts the streaming of the media in the playlist.

* * * * *